United States Patent [19]

Currall

[11] 4,101,161
[45] Jul. 18, 1978

[54] OPENING ROOF ASSEMBLIES FOR VEHICLES

[75] Inventor: John Josiah Currall, Birmingham, England

[73] Assignee: Weathershields Limited, Birmingham, England

[21] Appl. No.: 691,984

[22] Filed: Jun. 2, 1976

[30] Foreign Application Priority Data

Jun. 6, 1975 [GB] United Kingdom .............. 24350/75

[51] Int. Cl.² ............................................. B60J 7/18
[52] U.S. Cl. .......................... 296/137 H; 292/DIG. 5
[58] Field of Search ........... 296/137 E, 137 C, 137 G, 296/137 H; 292/DIG. 5, DIG. 46; 49/394

[56] References Cited

U.S. PATENT DOCUMENTS

| | | | |
|---|---|---|---|
| 2,201,330 | 5/1940 | Wernig et al. | 292/DIG. 5 X |
| 2,570,260 | 10/1951 | Milhan | 292/DIG. 5 X |
| 2,831,718 | 4/1958 | Hallek et al. | 292/DIG. 5 X |

FOREIGN PATENT DOCUMENTS

| | | | |
|---|---|---|---|
| 902,678 | 6/1972 | Canada | 296/137 C |
| 679,166 | 12/1964 | Italy | 296/137 H |

*Primary Examiner*—Evon C. Blunk
*Assistant Examiner*—Michael J. Forman
*Attorney, Agent, or Firm*—Scrivener, Parker, Scrivener & Clarke

[57] ABSTRACT

In an opening roof assembly for an opening in the roof of a vehicle the roof covering is tightened or released by a handle mechanism which is coupled to a flap through a pair of rods. The rods are moved towards and away from each other in response to rotation of the handle mechanism. The free ends of the rods work in inclined slots in downwardly depending flanges on the flap so that relative movement between the rods causes the flap to move angularly with respect to a front cross-member of the roof assembly on which it is pivotally mounted. Rotation of the handle mechanism in a direction to tighten the covering is accompanied by the flap being drawn down into close sealing engagement with the roof around the front of the opening.

9 Claims, 6 Drawing Figures

U.S. Patent July 18, 1978 4,101,161
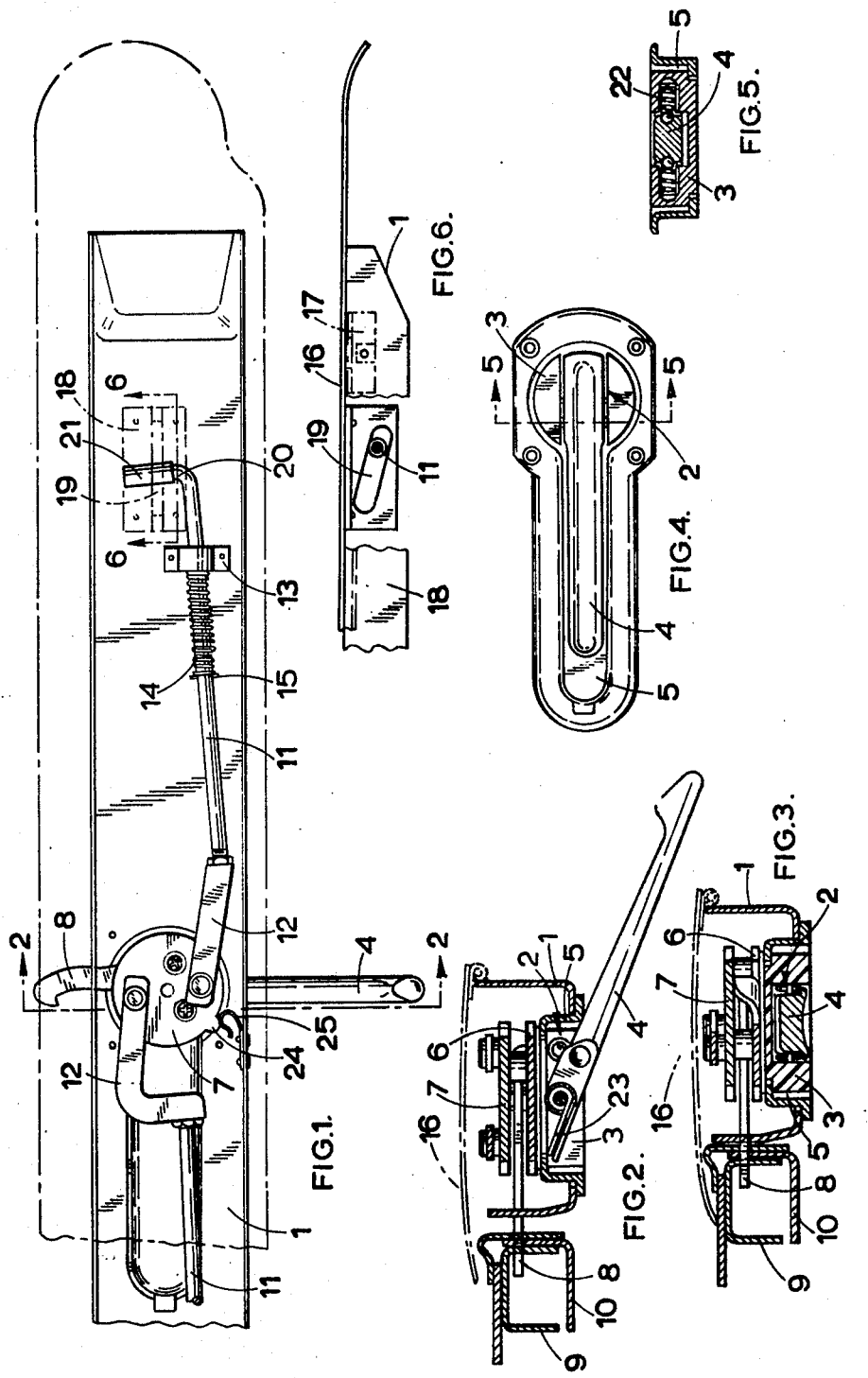

OPENING ROOF ASSEMBLIES FOR VEHICLES

This invention relates to opening roof assemblies for vehicles of the kind in which a longitudinal opening in the roof is provided with a flexible fabric covering supported by cross-members adapted to slide on guides extending along each side of the opening and the front cross-member has a purely sliding movement and carries handle-operated means for drawing the covering forwardly to tighten it, the front end of the covering being attached to a substantially rigid transverse flap which is in pivotal or rocking engagement with the front cross-member and is adapted to be positively drawn down into close sealing engagement with the roof around the front end of the opening by transmission means actuated by the handle-operated means for tightening the covering.

In one known opening roof assembly of the kind set forth for vehicles the transmission means comprise a cam upstanding from the handle-operated means and a torsion bar in the front cross-member with which the cam is engageable to cause it to rotate, the ends of the torsion bar being cranked and coupled to the flap to draw the flap down as the handle-operated means are rotated in a direction to tighten the fabric. In such a known construction the handle-operated means have to be extremely robust to withstand and transmit the relatively high torque which is developed when they are operated to rotate the torsion bar which, in turn, may cause wear of the cam and the torsion bar to occur.

According to our invention in an opening roof of the kind set forth for vehicles the handle-operated means are coupled to the flap through a pair of rods which are moved relatively towards and away from each other in response to rotation of the handle-operated means, the free ends of the rods work in downwardly depending inclined slots in the flap constructed and arranged such that relative movement between the rods causes the flap to move angularly with respect to the front cross-member, rotation of the handle-operated means in a direction to tighten the covering being accompanied by the flap being drawn down into close sealing engagement with the roof around the front of the opening.

This has the advantage that the torque developed by the handle-operated means is relatively small so that the handle operated means itself can be relatively light in construction. Also the interengaging parts of the rods and the slots may be of low-friction material to facilitate movement of the flap with respect to the cross-member.

Preferably the rods are urged axially towards each other to draw the flap down against the loading of springs which counterbalance the flap when the rods are moved in the opposite direction.

In one construction the front cross-member is of channel section with the flap hingedly connected to it adjacent to its rearmost upstanding flange.

An embodiment of the invention will now be described by way of example with reference to the accompanying drawings, in which:

FIG. 1 is a plan of part of the front portion of an opening roof with the fabric cover removed;

FIG. 2 is a section on the line 2—2 of FIG. 1;

FIG. 3 is a section similar to FIG. 2 but showing the flap in the lowered position and the front cross-member moved towards the end of an opening in the roof to tighten the covering;

FIG. 4 is a plan of the handle and a recessed part of the front cross-member with the handle in the position shown in FIG. 3;

FIG. 5 is a section along the line 5—5 of FIG. 4; and

FIG. 6 is an end elevation of part of the cross-member including a fragmentary transverse section along the line 6—6 of FIG. 1.

The opening roof illustrated in the drawings comprises a flexible fabric covering (not shown) supported by a series of cross-members of which only the front cross-member 1 is shown.

The front cross-member 1 comprises a channel section member which is slidably guided on flanges (not shown) on each side of the roof opening.

A locking mechanism 2 for the roof covering comprises a boss 3 which is rotatable by means of a handle 4 and is mounted in a recess 5 in the cross-member 1 at a position flush with the lower surface of the channel at substantially the mid-point in its length. The boss 3 is rotatable with a plate 6 on the inner side of the channel. A second plate 7 is superimposed upon, and rigidly coupled to the first plate 6. An eccentrically mounted hook 8 is pivotally connected to the first plate 6 for engagement with a keeper 9 mounted in a fixed cross-member 10 at the front of the opening, as shown in FIGS. 2 and 3. Two rods 11 are positioned in the cross-member 1 as shown in FIG. 1, one on each side of the locking mechanism 2. Fittings 12 are coupled to the inner ends of the rods and are pivotally connected to the second plate 7. The fittings 12 are coupled to the rods 11 for adjustment relative thereto in both an angular direction and in a direction to alter the effective length of the rods.

The rods 11 are slidably guided through openings in upstanding flanges 13 mounted in the base of the cross-member 1. The flanges 13 are preferably formed of nylon or other low-friction material. Compression springs 14 act between the flanges 13 and projections 15 on the rods so as to urge the rods in towards the locking mechanism 2.

A sheet metal or other substantially rigid flap 16 is connected along one edge to the rearmost upstanding flange of the cross-member 1 by means of hinges 17 positioned near each end of the flap, as shown in FIG. 6. The front end of the fabric covering is attached to the flap 16. Downwardly depending flanges 18 are mounted near each end of the flap 16. Each flange 18 contains an elongate slot 19 inclined downwardly towards an adjacent side of the opening (see FIG. 6) in which a cranked end portion 20 of one of the rods 11 engages.

To facilitate movement of the rods in the slots the cranked ends 20 are received in nylon or other suitable bushes 21 of low friction material. The bushes 21 rotate in the slots 19 in response to relative axial movement between the rods 11. The slots 19 themselves may also be formed with nylon or other low friction material to reduce friction and facilitate operation of the locking mechanism.

When it is desired to draw the cross member 1 and flap 16 into sealing engagement with the fixed cross member 10 at the front of the opening, the handle 4 is rotated in a clockwise direction, resulting in corresponding rotation of the plates 6, 7. As a result of rotation of the first plate 6 in a clockwise direction as viewed in FIG. 1, the hook member 8 will will be drawn inwardly relative to the cross-member 1 due to its eccentric pivotal mounting on the plate 6, and as the hook member 8 is retained in the keeper 9 as shown in FIG. 2, the cross-member 1 is drawn forwardly towards the front of the opening. Simultaneous rotation of the second plate 7 urges the rods 11 in towards the locking mechanism. The rods travel along the inclined slots 19 and thus force the flap 18 to pivot down at its edge remote from the hinges into close sealing engagement with the roof around the front end of the opening. This position is shown in FIG. 3. Rotation of the handle 4 in the opposite direction releases the flap 16 from the roof and moves the cross-member 1 away from front end of the opening, as shown in FIG. 2.

When the handle 4 reaches the closed position of the flap and cross-member it can be returned to an inoperative position in which it is received in the recess 5 so that it is flush with the base of the cross-member, as shown in FIG. 4. Preferably, springs 22 are provided in recesses in the boss 3 and act between the boss and the handle 4 so that the handle can not snap shut and trap an operators' fingers under the influence of a return spring 23 urging the handle towards the inoperative position.

When the handle 4 is rotated in an anti-clockwise direction towards the open position a projection 24 on the second plate 7 engages a leaf spring 25 mounted on the side wall of the channel, as shown in FIG. 1. At this point a greater force is required to rotate the handle any further in the same direction. The projection compresses the leaf spring 25 and passes over it, resulting in a "clicking" sound. The leaf spring 25 will then engage the opposite side of the projection 24 (the left hand side as viewed in FIG. 1) and will hold the plate, and therefore the handle, positively against rotation back in the opposite clockwise direction towards the closed position unless sufficient force is applied by an operator.

Our invention simplifies the construction of the opening roof assembly, reduces to a minimum the number of moving parts, and enables the handle to be of relatively light construction compatible with being able to transmit and withstand relatively small torque.

I claim:

1. An opening roof assembly for a longitudinal opening in a roof of a vehicle, said assembly comprising a flexible fabric covering, cross-members supporting said covering and including a front cross-member, guides extending along each side of said opening on which said cross-members are adapted to slide, handle-operated means carried on front cross-member for drawing said covering forwardly to tighten it, a substantially rigid transverse flap to which the front end of said covering is attached, a pivotal connection between said transverse flap and said front cross-member, transmission means between said flap and said front cross-member for drawing down said flap into close sealing engagement with said roof around the front end of said opening, said transmission means being actuated by said handle operated means and comprising a pair of rods mounted in said front cross-member, means for moving said rods relatively towards and away from each other in response to rotation of said handle-operated means, and downwardly depending flanges mounted on said flap and provided with inclined slots in which free ends of said rods engage.

2. An opening roof as claimed in claim 1, wherein said front cross-member is of channel section having forward and rear upstanding flanges, and a hinged connection is provided between said flap and said rear flange.

3. An opening roof as claimed in claim 1, wherein said handle operated means comprises a rotatable boss and first and second superimposed plates mounted on said boss, an eccentrically mounted hook being pivotally connected to said first plate and engaging a keeper in a frame at the front of said opening, and said second plate being pivotally connected to said rods.

4. An opening roof as claimed in claim 3, wherein fittings are pivotally connected to said second plate, said rods being adjustably connected to said fittings.

5. An opening roof as claimed in claim 1, wherein upstanding flanges are provided in said cross-member, said flanges having slots through which said rods pass.

6. An opening roof as claimed in claim 5, wherein projections are provided on said rods between said flanges and said handle-operated means, and compression springs act between said flanges and said projections.

7. An opening roof as claimed in claim 6, wherein said flanges are made of nylon.

8. An opening roof as claimed in claim 1, wherein said downwardly depending flanges on said flap are made of nylon.

9. An opening roof as claimed in claim 1, wherein said free ends of said rods which engage said slots are cranked, nylon bushes being provided on said cranked ends.

* * * * *